March 4, 1969  H. T. KIFOR ET AL  3,430,533
AIRCRAFT DISPENSER POD HAVING SELF-SEALING EJECTION TUBES
Filed Aug. 5, 1967
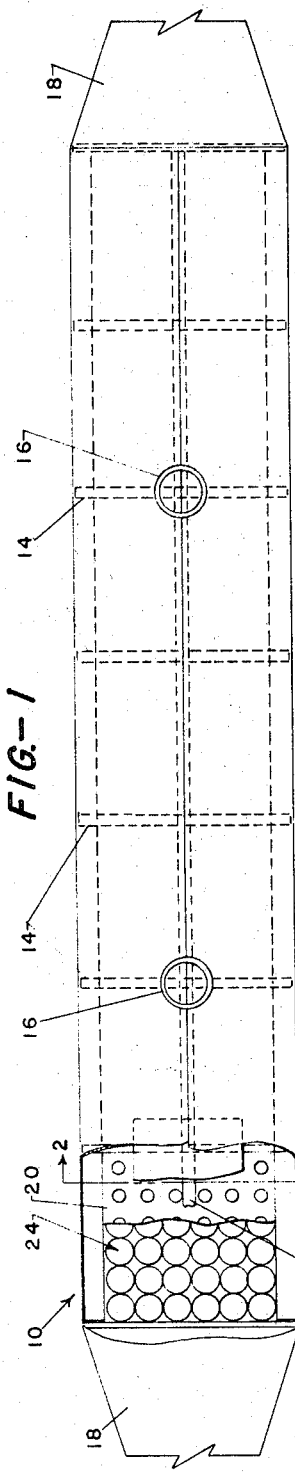
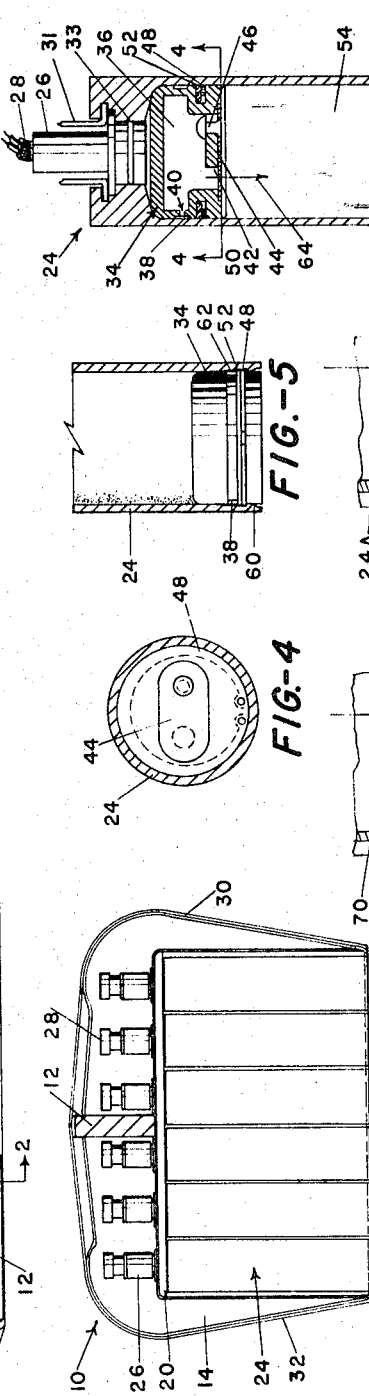
INVENTORS
HARRY T. KIFOR
CHARLES R. LEVESQUE
LESTER W. MUSSER
WALTER F. SPRICK
BY: Oldham & Oldham
ATTORNEYS United States Patent Office 3,430,533
Patented Mar. 4, 1969

3,430,533
AIRCRAFT DISPENSER POD HAVING SELF-SEALING EJECTION TUBES
Harry T. Kifor, Canton, Walter F. Sprick, Akron, Lester W. Musser, Barberton, and Charles R. Levesque, Cuyahoga Falls, Ohio, assignors to Goodyear Aerospace Corporation, Akron, Ohio, a corporation of Delaware
Filed Aug. 3, 1967, Ser. No. 658,150
U.S. Cl. 89—1.5      4 Claims
Int. Cl. F41f 5/02

ABSTRACT OF THE DISCLOSURE

A dispensing pod for supersonic aircraft having self-sealing ejection tubes. Specifically, the piston associated with the ejection tube has a self-locking ring that locks the piston at the open end of the ejection tube after the material from the tube has been ejected so that the blunt end of the piston aligns with the aerodynamic skin of the pod to give good aerodynamic flow properties. The locking ring also limits the movement of the piston down the ejection tube under a gas piston application force.

---

It has long been quite convenient or expedient to dispense various articles from airplanes, such as flares, propaganda leaflets, radar chaff, etc. It has been found, however, that many problems develop in attempts to dispense these type of article from supersonic aircraft due to the fact that the dispensing tube cavities after the payload has been ejected therefrom cause induced air turbulence which results in increased aerodynamic loads and vibration effects on the supersonic aircraft.

It is the general object of the present invention to provide an article dispensing pod readily attachable to a supersonic aircraft which pod has self-sealing dispensing tubes which tend to eliminate the aerodynamic loads and vibration effects which are present whenever an open tube is subjected to supersonic velocity air streams.

Basically, the dispensing pod of the invention incorporates a plurality of thin-walled metal dispensing tubes having a tapered open end and a closed end, with each tube containing an inserted piston assembly. Explosive cartridge means are positioned in the closed end of the tube and the article to be dispensed is loaded into the open end of the tube and positioned between the open end thereof and the piston means. When the explosive cartridge is energized, the energy released thereby drives the piston assembly and the article to be dispensed ahead of it toward the open end of the tube, with the piston assembly being stopped at the open end of the tube by means of a piston ring which expands into the tapered end of the tube in order to lock the piston at the open end of the tube in a position such that the piston effects a closure of the tube.

For a better understanding of the apparatus of the invention, reference should be had to the following drawings wherein:

FIGURE 1 is a plan view of the dispensing pod of the invention;

FIGURE 2 is a cross sectional view of the dispensing tube arrangement taken substantially along line 2—2 of FIGURE 1;

FIGURE 3 is an enlarged vertical section showing the specific structure of the self-sealing dispensing tube incorporated in the invention;

FIGURE 4 is a horizontal sectional view taken on line 4—4 of FIGURE 3;

FIGURE 5 is a fragmentary vertical section similar to FIGURE 3, particularly illustrating the piston assembly locked at the open end of the dispensing tube in a closed position;

FIGURE 6 is a fragmentary enlarged vertical section of a slight modification of the self-sealing dispensing tube incorporated in the dispensing pod of the invention; and FIGURE 7 is a fragmentary vertical section similar to FIGURE 6, particularly illustrating the piston assembly of the modification of FIGURE 6 in a locked position at the open end of the dispensing tube.

It should be understood that the main purpose of the invention is to provide a pod readily mountable to an aircraft which would permit dispensing of materials therefrom at supersonic velocities. The particular pod illustrated is designed in order to permit dispensing of precut chaff for radar counter measures and it will be so described, but it should be understood that the pod with the self-sealing dispensing tube of the invention can be used for other purposes than dispensing radar chaff. For example, the particular pod of the invention could be used for dispensing flares, incendiaries, smoke screens, fog and rain seeding, antitank mines, propaganda leaflets, etc.

Now referring to the invention in greater detail, in FIGURE 1 the numeral 10 generally indicates a pod adapted to be secured to a supersonic aircraft. The pod 10 is formed from a suitable frame means consisting of a center hardback section 12 which extends longitudinally substantially the entire length of the pod 10, and a plurality of structural bulkheads 14 which are individually secured to the center hardback section 12. Mounted to the center hardback section 12 are a pair of suspension lugs 16 which permit the pod 10 to be readily mounted to an aircraft, generally beneath the wings or the fuselage. The pod 10 also has a pair of cone-shaped end sections 18 which are particularly adapted to improve the aerodynamic flow of air therearound.

In order to mount a plurality of dispensing or ejection tubes in the pod 10, a honey-combed mounting panel or mounting plate 20 is secured to the hardback center section 12. Also, a honey-combed base plate 22 is secured to the bottom of the bulkheads 16. As is best illustrated by FIGURE 2, mounting plate 20 and base plate 22 are mounted to the pod 10 in substantially spaced, parallel relation to each other. A plurality of dispensing or ejection tubes, generally indicated by the numeral 24, are secured to and extend downwardly from the mounting plate 20, each tube being secured to the mounting plate 20 substantially in alignment with one of the respective holes in the mounting plate 20. The purpose of such is to allow a gas generator 26 and an electrical connector or squib 28 to be dropped down through the hole in the mounting plate and connected with a respective ejection tube. The ejection tubes 24 are nested in the bottom base plate with each ejection tube being aligned with and received by a respective hole in the base plate 22. The main purpose of the base plate 22 is thus to fill in the open gaps between the ejection tubes 24 in order to achieve aerodynamic cleanliness and also to locate and provide mounting support for each individual ejection tube 24. The pod 10 also is covered with detachable skin halves 30 and 32 which are adapted to be easily removed in order to permit quick and complete access to the ejection tube assembly mounted in pod 10.

Now with particular reference to the ejection tube assembly incorporated in the pod 10, reference should be had to FIGURE 3 where one of the ejection tubes 24 is illustrated in greater detail. The ejection tube 24 basically consists of a thin-walled, extruded metal tube which has an open end and a closed end. Adapted to be mounted to the closed end is gas generator 26 and an electrical connector 28 as mentioned hereinbefore. Clip means 31 are provided to allow the gas generator 26 to be removably secured to the closed end of the tube 24. A suitable O-ring 33 is provided to achieve a seal of the gas generator with the closed end of the tube after the generator has been mounted thereon.

Adapted to be inserted into the open end of the ejection tube 24 and to have close sliding relationship therewith is a piston means or a piston assembly which is generally indicated by the numeral 34. As is best illustrated by FIGURE 3, the piston 34 has a hollow center section or opening 36 provided therein with a circumferentially extending groove 38 and an exhaust hole 40 providing access thereinto. Also an opening 42 is provided in the bottom of the piston 34. A suitable spring metal flapper 44 mounted to the piston by rivet 46 guards the opening 42 into the center section 36 allowing only one way passage of gas from the center section 36 through the opening 42. The purpose of the exhaust holes 40 and 42 provided in the piston 34 will become evident hereinafter as the actual working of the ejection tube assembly is explained in greater detail.

In order to adapt the ejection tube assembly to be self-closing, a piston ring 48 is received by a circumferential groove 50 in the outer periphery of the piston 34. Also received in circumferential groove 50 is a plastic sealing and cushioning ring 52 which cushions the piston ring against the piston as a self-sealing action of the tube is accomplished, as will be explained hereinafter.

Loaded into the ejection tube 24 are a plurality of chaff package means 54 which are inserted into the open end of the ejection tube and positioned between the open end thereof and the piston 34. A plurality of spacer members 56 are received between each chaff package in order to insure that the ejection tube can be tightly loaded with the chaff package means. Also these spacer means allow for various tolerances so that the same tubes can be used to load radar chaff of various wave lengths. In order to retain the chaff packages within the ejection tube after they have been inserted therein, a snap out retainer cap means 58 is adapted to engage with a shoulder of flange 60 provided on the internal peripheral surface of the tube 24. Normally this cap means 58 is made from a resilient rubber or plastic.

The internal peripheral surface of the open end of the tube 24 has a slightly outwardly tapered portion 62 which terminates in shoulder 60. The purpose of the slightly tapered portion 62 is to provide room for the piston ring 48 to expand into abutting engagement with the flange 60 after the ejection tube has been fired and the piston 34 is driven toward the open end of ejection tube 24. This action results in the piston being locked at the open end of the tube in a position such that the piston effects a closure of the tube after the payload has been dispensed therefrom. This locked position of the piston at the open end of the tube is best illustrated by FIGURE 5.

In this view, the gas generator has been energized with the energy released thereby driving the piston means 34 and the chaff package means 54 toward the open end of the tube. When such occurs, the force of the piston 34 forcing the chaff package means 54 against the retainer cap 58 effects a snapping out of the retainer cap 58, thereby allowing the chaff package means 54 to be dispensed out of the open end of the tube 24 and into the open air. The piston 24 will continue to drive toward the open end of the tube until the piston ring 48 received by the groove 50 provided in the piston 34 expands into the taper 62 provided in the internal peripheral surface of the tube 24. As the piston ring 48 expands into the tapered portion 62, it will suddenly abut against shoulder 60 to lock the piston in the open end of the tube, to thereby effect a closure of the tube. The plastic cushioning ring 52 reduces the jar of the piston ring agains the shoulder 60. The fact that the piston has been locked at the open end of the tube to effect a closure of the tube after the chaff packages have been dispensed therefrom minimizes the aerodynamic loads and vibration effects which are present whenever an open tube is subjected to supersonic velocity air streams.

The chaff ejection tube 24 can be easily reloaded by merely sliding the piston back up into the ejection tube until the piston ring is once again flush with the outer peripheral surface of the piston 34. Additional chaff package means or the like can then be loaded into the tube with the snap out retainer cap 58 being engaged to hold the chaff packages within the tube. It should be noted that as the piston 34 is forced back up into the ejection tube 24, any remaining gasses in the ejection tube between the closed end thereof and the piston 34 will leak around into circumferential groove 38 provided in the piston and through the exhaust hole 40 and into the central cavity 36 of the piston. Thus, as the piston is moved upwardly back into the ejection tube, the gas will flow in the direction of arrows 64 with flapper 44 being pushed open to allow the gas to exhaust from the open end of the ejection tube.

Referring to FIGURES 6 and 7, these figures illustrate a slight variation or modification of the ejection tube adapted to be loaded into the dispensing pod of the invention. In this variation, ejection tube 24A also has an outwardly tapered section 62A provided in the internal peripheral surface of the open end of the tube 24A. The tapered section 62A terminates in an annular flange or shoulder 60A. An annular groove 66 is formed around the internal peripheral surface at the end of the tube 24A and is adapted to retain the peripheral edge of a snap out retainer cap 58A to hold the chaff 54 within the ejection tube of the invention.

A piston 34A is slidably received within the ejection tube 24, wih piston 34A having a hollowed out center area provided therein adapted to receive insulation material 68 which is utilized to protect the chaff 54A. In this modification, the piston 34A is provided with an annular groove 50A in its peripheral surface, which groove receives a piston ring 48A. This embodiment is particuarly adapted for use where only one chaff package 54A is to be dispensed from each dispensing tube. As a result, a spacer tube 70 is provided which is adapted to position the piston 34A adjacent to the chaff package 54A so that the chaff package is firmly contained and held within the ejection tube 24A. It should be understood that various lengths of spacer tube 70 can be utilized in order to adapt the ejection tube of this modification to various lengths of radar chaff 54A which are to be dispensed from the ejection tube 24A.

FIGURE 7 illustrates the manner in which the piston ring 48A expands into the tapered portion 60A and then abuts against shoulder 60A in order to lock the piston at the open end of the tube in such position that the piston effects a closure of the tube. Note that the piston fills the bottom of the tube to form a flat and clean surface which greatly increases the aerodynamic design of the pod. It should also be noted that a port 72 is provided at the open end of the ejection tube 24A in order to allow the gasses which powered the piston 34A to its locked position to exhaust. In this variation, again all that need be done to reuse the ejection tube of the pod of the invention is to merely force the piston up until it again is lodged against a spacer tube 70.

While a certain representative embodiment and details have been shown for the purpose of illustrating the invention, it will be apparent to those skilled in this art that various changes and modifications may be made therein without departing from the spirit or scope of the invention.

What is claimed is:

1. A tube for ejecting precut chaff or the like from an aerodynamically designed dispensing pod, including:
   a frame having an aerodynamically designed skin,
   a thin-walled dispensing tube having an open end and a closed end mounted by the frame so the open end is flush with the skin,
   explosive cartridge means positioned in the closed end of the tube, piston means having a substantially blunt end and an open end slidably received within said tube so the blunt end faces the open end thereof, chaff package means or the like loaded into the open end of said tube and positioned between the open end thereof and said piston means, snap-out retainer cap means removably mounted to the open end of said tube and adapted to retain the package means in the tube, means for selectively energizing said explosive cartridge means so that the energy released thereby drives the piston and the package means loaded ahead of it toward the open end of the tube, thereby forcing the retainer cap means away from the open end of the tube to allow the package means to be dispensed out of the tube and into the open air, and means for limiting the movement of and locking the piston means at the open end of the tube in a position such that the blunt end of said piston means is flush with the edge of the tube at the open end thereof to form an aerodynamically smooth surface with the skin.

2. The combination according to claim 1 wherein the open end of said tube has a portion of its inner circumferential periphery tapered slightly outwardly from a spaced relation to the open end of the tube, said taper directed toward the end of the tube, and the taper terminating in a circumferentially extending shoulder on the inner peripheral surface of the tube adjacent the open end thereof.

3. The combination according to claim 1 wherein said means for locking the piston means at the open end of the tube is a piston ring received in a circumferentially extending groove in said piston means, said piston ring being under compression and tending to expand into the taper at the tube end and into engagement with the shoulder flange of the tube to thereby releasably retain the piston means at the open end of the tube.

4. The combination according to claim 1 and including:
a resilient cushioning ring received by the circumferentially extending groove in said piston means, said ring adapted to seal the piston means as it slides in said tube and also to cushion the force received by the piston ring as it engages with the shoulder on the inner pheripheral surface of the tube adjacent the open end.

References Cited
UNITED STATES PATENTS

| | | | |
|---|---|---|---|
| 1,417,500 | 5/1922 | Coley et al. | 89—1.5 |
| 2,807,193 | 9/1957 | Robert et al. | 89—1.5 |
| 2,938,429 | 5/1960 | Vaglowski et al. | 89—1 |
| 3,216,322 | 11/1965 | Wenger et al. | 89—1.5 |
| 3,247,795 | 4/1966 | Abela | 102—38 |
| 3,266,372 | 8/1966 | Mack et al. | 89—1.5 |

SAMUEL W. ENGLE, *Primary Examiner.*

U.S. Cl. X.R.

244—136; 102—37.6